M. MERRILL.
Manufacture of Turn-Buckles.
No. 166,286. Patented Aug. 3, 1875.
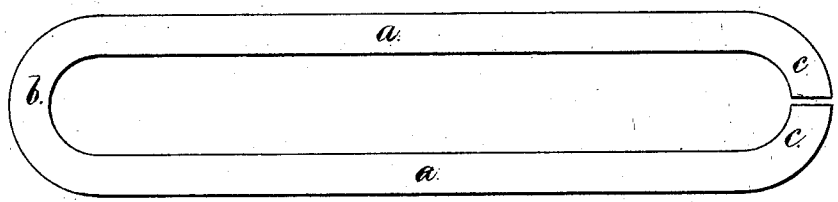
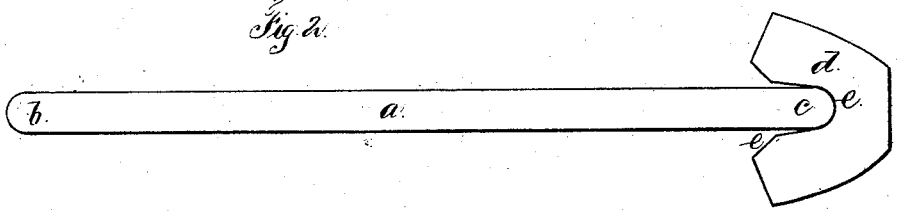
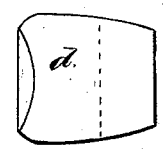
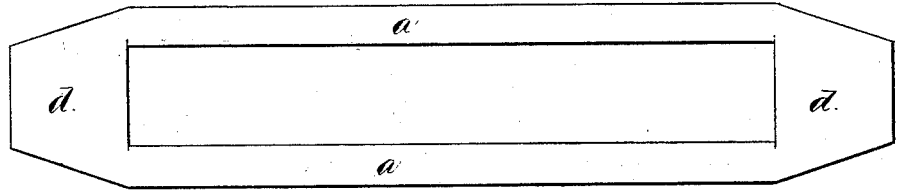
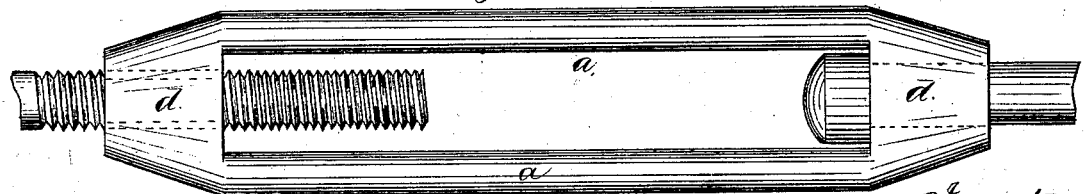
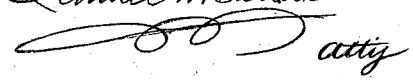
Inventor
Manning Merrill
per Lemuel W. Serrell
atty
Witnesses
Chas. H. Smith
Geo. D. Pinckney

UNITED STATES PATENT OFFICE.

MANNING MERRILL, OF NEW YORK, N. Y., ASSIGNOR TO HIMSELF AND EDWARD W. MERRILL, OF SAME PLACE.

IMPROVEMENT IN THE MANUFACTURE OF TURN-BUCKLES.

Specification forming part of Letters Patent No. 166,286, dated August 3, 1875; application filed November 12, 1874.

*To all whom it may concern:*

Be it known that I, MANNING MERRILL, of the city and State of New York, have invented an Improvement in Turn-Buckles for Screw-Rods, of which the following is a specification:

Turn-buckles have heretofore been made of two rods, united at the ends with the blocks through which the rods pass, and one or both of these blocks have been provided with a screw-thread for the screw upon the rod. There is difficulty in properly welding these rods to the blocks, because the metal of the rods is not incorporated into the metal of the blocks, but only united by longitudinal welds at the sides. In some cases the rods at the sides of the turn-buckle have been drawn or forged down from the block forming the ends; but this involves considerable labor, and the welds of the rods are liable to be imperfect.

My present invention is for the purpose of incorporating the metal of the blocks with the metal of the rods in such a manner that a defect in the welding and weakness cannot exist, and the fiber of the iron runs in the direction of the strain, and the turn-buckle is made with much less labor than heretofore.

I make use of a link such as shown in Fig. 1, having side portions $a\ a$, a bend, $b$, in the middle, and bends $c\ c$ at the ends of the rod, or else I use two pieces with bends, such as at $c\ c$, at both ends. The block $d$, Figs. 2 and 3, is opened at $e$ sufficient to receive the ends $c\ c$, and such ends and block are heated to a welding heat and set together in a holding-die, and then the block is closed and compressed by a hammer-swage and drop-die, which welds the metal together into the form shown in Fig. 4. The bend $b$ has a similar block, $d$, welded around it, which finishes the welding or forging operations. It is generally preferable to employ two dies in forging—the one to close the metal fully around the ends $c$ and make a perfect weld, the other to give a smooth exterior finish; and, to make perfect uniformity in the turn-buckle, this last die should be double and act upon both the ends simultaneously.

Fig. 5 represents the finished turn-buckle.

In consequence of this mode of manufacturing turn-buckles, the ends of the rods $a\ a$ enter into the blocks $d$, and are spread within the metal of them, and so fully incorporated that there is no possibility of the metal separating, even if the weld should be imperfect, because the metal of the block is closed around the bent ends so perfectly as to completely inclose them.

This improvement might be applied to a shackle with only one block, $d$, uniting the ends of an otherwise open link.

I claim as my invention—

The method of preparing the link shown in Fig. 1, and adding to the bent ends thereof the block $d$, so as to encompass said bent ends, and welding said block to said ends, as hereinbefore specified.

Signed by me this 6th day of November, A. D. 1874.

MANNING MERRILL.

Witnesses:
GEO. T. PINCKNEY,
CHAS. H. SMITH.